United States Patent
Lee et al.

(10) Patent No.: US 7,907,294 B2
(45) Date of Patent: Mar. 15, 2011

(54) APPARATUS TO PRINT PRINT DATA WHEN COLORS CONTAINED IN CARTRIDGE ARE INSUFFICIENT AND METHOD THEREOF

(75) Inventors: Sang-hyup Lee, Suwon-si (KR); Young-ju Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1737 days.

(21) Appl. No.: 11/103,609

(22) Filed: Apr. 12, 2005

(65) Prior Publication Data

US 2005/0231748 A1    Oct. 20, 2005

(30) Foreign Application Priority Data

Apr. 20, 2004    (KR) .................. 10-2004-0027044

(51) Int. Cl.
G06F 15/00 (2006.01)
G06K 1/00 (2006.01)
G06K 15/00 (2006.01)
H04N 1/60 (2006.01)

(52) U.S. Cl. ........................... 358/1.14; 358/1.9

(58) Field of Classification Search .............. 347/6, 7; 358/1.15, 1.1, 1.2, 1.6, 1.7, 1.8, 1.14, 1.18, 358/1.9, 512, 527, 515–519
See application file for complete search history.

(56) References Cited

U.S. PATENT DOCUMENTS

| 6,360,174 | B1 * | 3/2002 | Shoki ................... 702/55 |
| 6,977,742 | B2 * | 12/2005 | Harper ............... 358/1.15 |
| 7,172,260 | B2 * | 2/2007 | Yoshida et al. ............. 347/7 |
| 7,210,755 | B2 * | 5/2007 | Kubota et al. ............ 347/7 |
| 7,639,379 | B2 * | 12/2009 | Enomoto et al. ......... 358/1.14 |
| 2001/0003457 | A1 * | 6/2001 | Doi ......................... 347/5 |
| 2002/0163570 | A1 * | 11/2002 | Phillips ................. 347/224 |
| 2003/0043231 | A1 * | 3/2003 | Byers et al. .............. 347/43 |
| 2004/0041856 | A1 * | 3/2004 | Im et al. ................. 347/7 |

FOREIGN PATENT DOCUMENTS

| JP | 10-254213 | | 9/1998 |
| JP | 10-258530 | * | 9/1998 |
| JP | 2001-018456 | | 1/2001 |

* cited by examiner

*Primary Examiner* — Douglas Q Tran
(74) *Attorney, Agent, or Firm* — Stanzione & Kim, LLP

(57) ABSTRACT

An apparatus and method of efficiently forming an image of print data even if the residual amount of toner or ink of a specified color is insufficient. The method includes calculating an amount of ink or toner of each color that is required to form the image of the print data, comparing the calculated required amount of the ink or toner of each color with a stored residual amount of the ink or toner of each color, and forming the image of the print data using the ink or toner of the color of which the residual amount of the ink or toner is sufficient if there is any color of which the stored residual amount of the ink or toner is less than the required amount of the ink or toner as a result of the comparison.

20 Claims, 5 Drawing Sheets

APPARATUS TO PRINT PRINT DATA WHEN COLORS CONTAINED IN CARTRIDGE ARE INSUFFICIENT AND METHOD THEREOF

CROSS-REFERENCE TO RELATED APPLICATIONS

This application claims benefit under 35 U.S.C. §119 from Korean Patent Application No. 2004-27044, filed on Apr. 20, 2004, the content of which is incorporated herein in its entirety and by reference.

BACKGROUND OF THE INVENTION

1. Field of the Invention

The present general inventive concept relates to an image forming apparatus. More particularly, the present general inventive concept relates to an apparatus and method to efficiently perform a printout irrespective of an insufficiency of colors contained in a toner or ink cartridge used in the image forming apparatus.

2. Description of the Related Art

Image-forming apparatuses print images provided from monitors, television sets (TVs) or other video output apparatuses. The monitors, TVs and other video output apparatuses use an RGB (Red, Green, Blue) color model, and the image forming apparatuses use a CMYK (Cyan, Magenta, Yellow, Black) color model. Hereinafter, particulars of the RGB color model and the CMYK color model will be explained.

The RGB color model is used in monitors, TVs and other video output apparatuses that implement colors by a principle of light. This color model represents colors based on the three primary colors of light, and has characteristics in that mixed colors become brighter than the colors before being mixed. Accordingly, a color representation by mixing the colors in the RGB color model is called an additive color mixture.

The CMYK color model is used in color printing. If colors are mixed in the CMYK color model, a tone of the mixed color becomes darker than the original colors. This kind of color mixture is called a subtractive color mixture. An operation of the image forming apparatus will be explained.

FIG. 1 is a block diagram illustrating a construction of a conventional image forming apparatus and a host computer.

Referring to FIG. 1, the image forming apparatus 100 includes a printing unit 102, a memory unit 104, a control unit 106, a storage unit 110, and a toner or ink cartridge unit 108. The host computer 120 includes an interface unit 122, a printer driver 124, a half-toning unit 130, a rendering unit 126, and a color matching unit 128

The printing unit 102 prints print data transferred from the control unit 106. The control unit 106 controls the components of the image forming apparatus 100 according to a control program. The memory unit 104 temporarily stores the print data which is transferred to the control unit 106 from the host computer 120, or stores information required to print the print data. The toner or ink cartridge unit 108 contains toner or ink for printing the print data. The storage unit 110 stores a residual amount of the toner or ink contained in the toner or ink cartridge unit. It will be apparent that the memory unit 104 and the storage unit 110 may be constructed into one device.

The interface unit 122 of the host computer 120 accesses to the image forming apparatus 100, and supports a communication interface between the host computer 120 and the image forming apparatus 100. The interface unit 122 may be implemented by an IEEE1284, USB, wireless, GPS or RS232C interface module or a network interface module. The interface unit 122 transmits the print data from the host computer 120, and provides the print data to the control unit 106 of the image forming apparatus 100. The printer driver 124 receives a print command to print a document (that is, print data) that a user has prepared using an application program, and transfers the print data to the rendering unit 126. The rendering unit 126 performs a rendering process for the transferred print data. The color matching unit 128 performs a color matching process for the print data for which the rendering process has been performed. The half-toning unit 130 performs a half-toning process for the print data for which the color matching process has been performed, and transfers the print data for which the color matching process has been performed to the interface unit 122.

FIG. 2 is a flowchart illustrating a conventional process of generating print data and transferring the generated print data from a host computer to an image forming apparatus. Hereinafter, with reference to FIG. 2, the conventional process of generating the print data that is performed by the host computer will be explained.

At step S200, the host computer receives a user's instructions to form an image of a specified document (print data). Generally, the user instructs the host computer to form the image using a keyboard. At step S202, the host computer performs a rendering process for the print data. At step S204, the host computer calculates a necessary amount of toner or ink of each color with respect to the rendered print data.

At step S206, the host computer compares the necessary amount of toner or ink of each color calculated at the step S204 with a stored amount of toner or ink of each color. At step S208, the host computer determines whether there is any color of which the stored amount of toner or ink is less than the necessary amount of toner or ink. If it is determined that there is any color of which the stored amount of toner or ink is less than the necessary amount of toner or ink, the host computer proceeds to step S210. If it is determined that there is no color of which the stored amount of toner or ink is less than the necessary amount of toner or ink, the host computer proceeds to step S212.

At the step S210, the host computer determines whether to continue the image forming process. If the host computer determines to continue the image forming process, it proceeds to the step S212, and, if the host computer determines not to continue, it proceeds to step S214. At the step S214, the host computer cancels the image forming process. At the step S212, the host computer performs color matching. At step S216, the host computer performs a half-toning process for the print data, and at step S218, the host computer transmits the print data to a spooler and temporarily stores the print data therein. At step S220, the image forming apparatus forms the image of the temporarily stored print data.

As described above, according to the conventional apparatus and method, the image forming is performed using only the remaining colors other than the color of which the amount of toner or ink is insufficient if the amount of toner or ink of any color necessary for the image forming of the print data is insufficient. Even if only a specified color is insufficient, a host computer displays a warning message that all of the colors are insufficient, and thus the user does not know which color is actually insufficient.

SUMMARY OF THE INVENTION

The present general inventive concept provides an apparatus and method of enabling a user to promptly obtain information on toner or ink of a specified color of which a residual amount is insufficient.

The present general inventive concept also provides an apparatus and method of efficiently forming an image of print data even if a residual amount of toner or ink of a specified color is insufficient.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a method of forming an image of print data, independently performed by an image forming apparatus without being connected to a host device, the method comprising calculating an amount of ink or toner of each color that is required to form the image of the print data, comparing the calculated required amount of the ink or toner of each color with a stored residual amount of the ink or toner of each color, and forming the image of the print data using the ink or toner of the colors of which the residual amount of the ink or toner is sufficient if there is any color of which the stored residual amount of the ink or toner is less than the required amount of the ink or toner as a result of the comparison.

The foregoing and/or other aspects and advantages of the present general inventive concept may also be achieved by providing a method of processing print data and transferring the print data from a host device to an image forming apparatus in a system including the host device and the image forming apparatus to form an image of the print data transferred from the host device, the method comprising calculating an amount of ink or toner of each color that is required to form the image of the print data, comparing the calculated required amount of the ink or toner of each color with a residual amount of the ink or toner of each color that is transferred from the host device and stored, and forming the image of the print data using the ink or toner of the colors of which the residual amount of the ink or toner is sufficient if there is any color of which the stored residual amount of the ink or toner is less than the required amount of the ink or toner as a result of the comparison.

The foregoing and/or other aspects and advantages of the present general inventive concept may also be achieved by providing an apparatus to form an image of stored print data, comprising a calculation unit to calculate an amount of ink or toner of each color that is required to form the image of the read print data, a comparison unit to compare the calculated required amount of the ink or toner of each color with a stored residual amount of the ink or toner of each color, and a control unit to control the apparatus to form the image of the print data using the ink or toner of the colors of which the residual amount of the ink or toner is sufficient if there is any color of which the stored residual amount of the ink or toner is less than the required amount of the ink or toner as a result of the comparison.

The foregoing and/or other aspects and advantages of the present general inventive concept may also be achieved by providing a system, having a host device and an image forming apparatus to form an image of print data transferred from the host device. The image forming apparatus comprises a calculation unit to calculate an amount of ink or toner of each color that is required to form the image of the read print data, a comparison unit to compare the calculated required amount of the ink or toner of each color with a stored residual amount of the ink or toner of each color, and a printer driver to instruct the image forming apparatus to form the image of the print data using the ink or toner of the colors of which the residual amount of the ink or toner is sufficient if there is any color of which the stored residual amount of the ink or toner is less than the required amount of the ink or toner as a result of the comparison.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
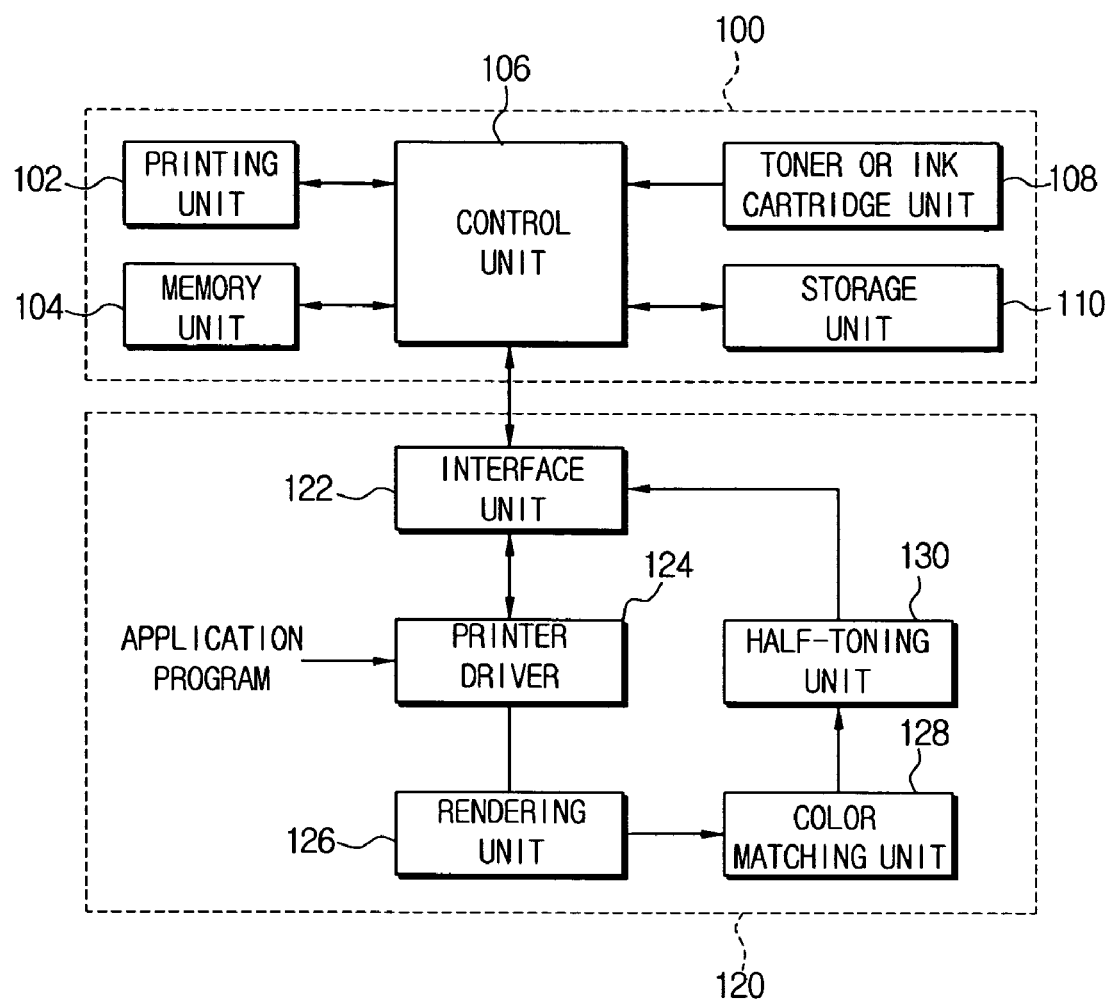
FIG. 1 is a block diagram illustrating a construction of a conventional image forming apparatus and host computer.
Figure 2:
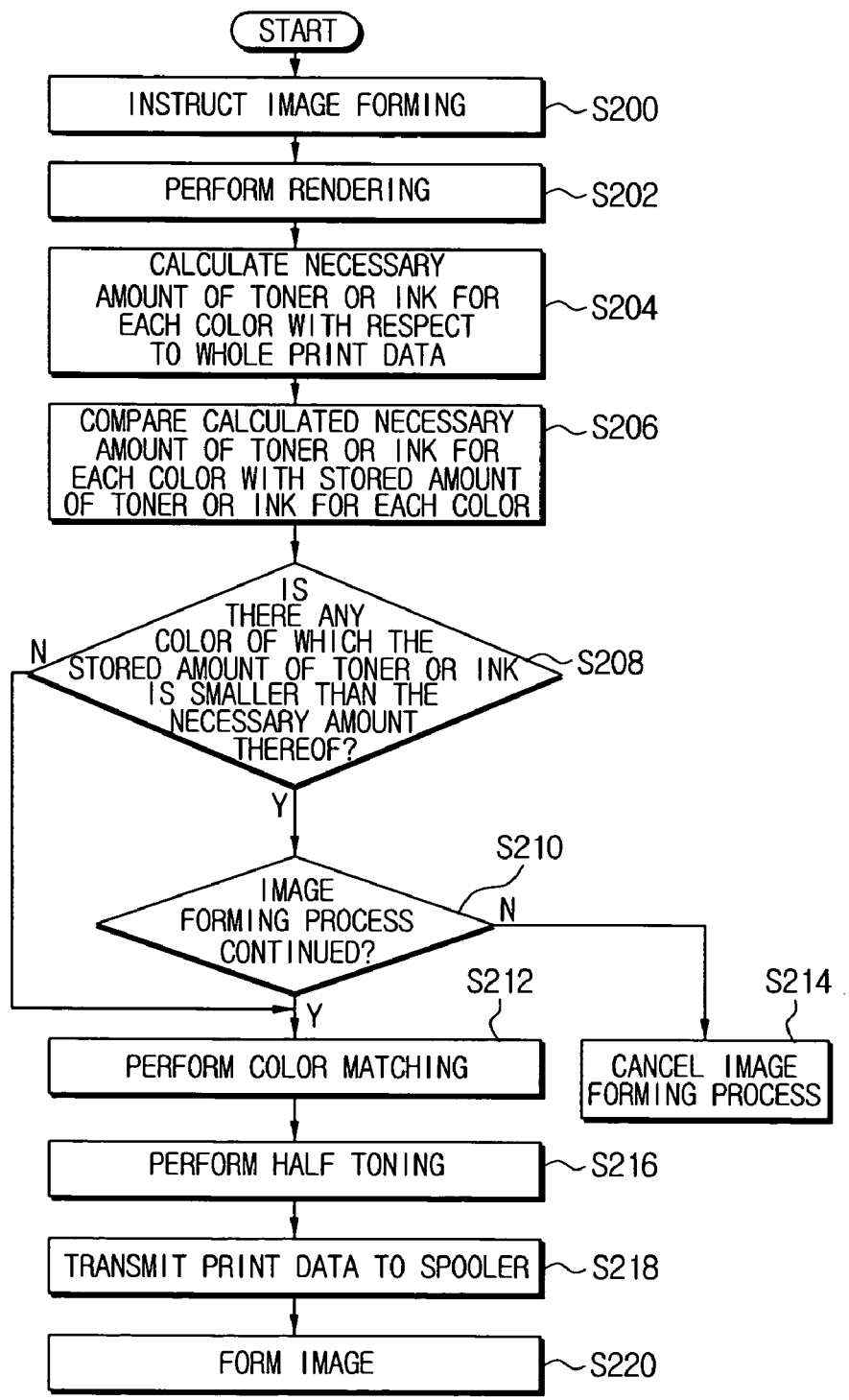
FIG. 2 is a flowchart illustrating a conventional process of forming an image of print data.

Certain embodiments of the present general inventive concept will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 3:
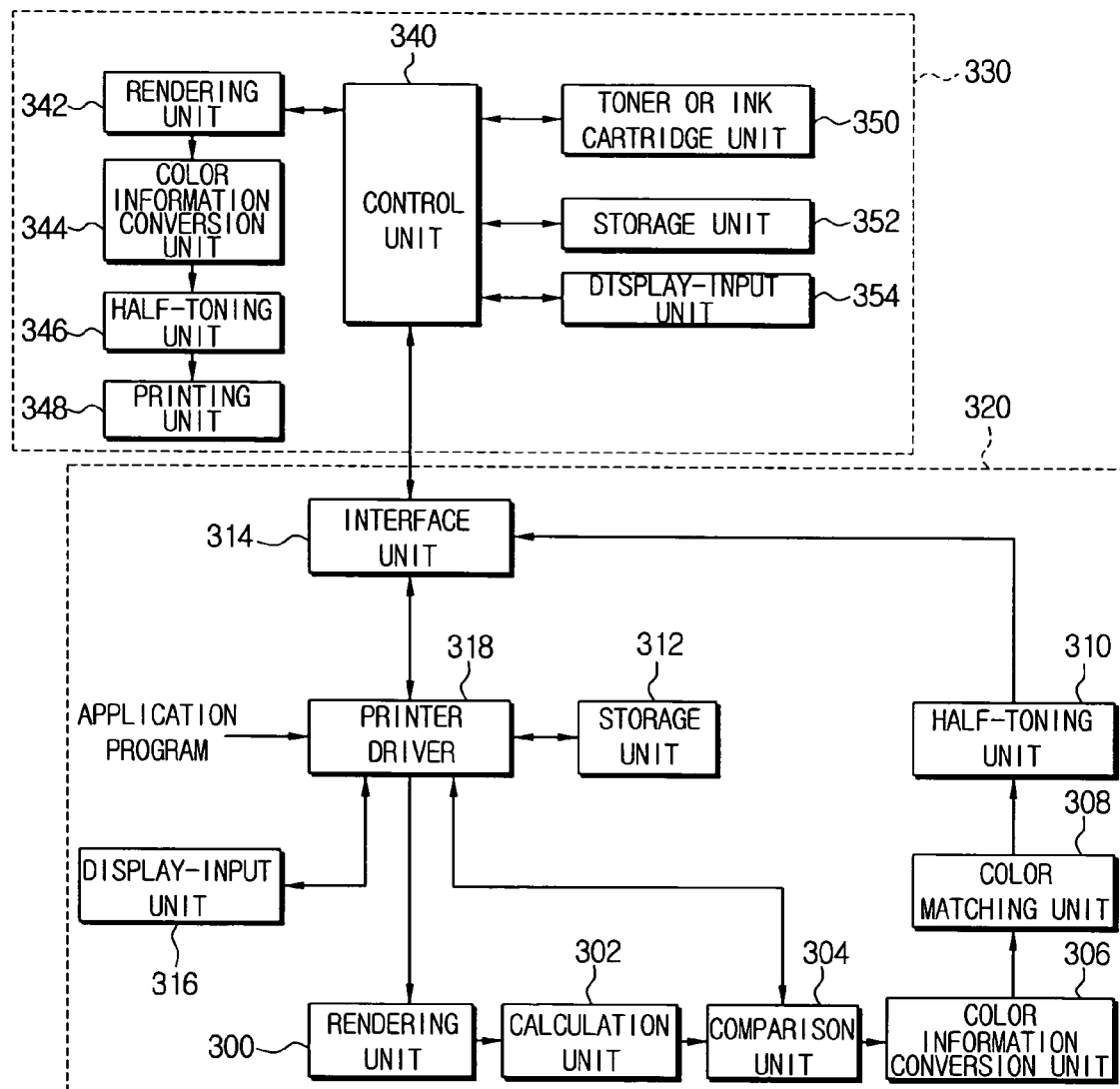
FIG. 3 is a block diagram illustrating a construction of a host computer that determines whether there is any insufficient color according to an embodiment of the present general inventive concept.

FIG. 3 is a block diagram illustrating a construction including a host computer to detect an insufficient amount of toner or ink of any color and an image forming apparatus connected to the host computer according to an embodiment of the present general inventive concept. Although other components in addition to the construction as illustrated in FIG. 3 may be included in the host computer and the image forming apparatus, only components applicable to this embodiment of the present general inventive concept are illustrated in FIG. 3.

Referring to FIG. 3, the host computer 320 can include an interface unit 314, a printer driver 318, a storage unit 312, a rendering unit 300, a calculation unit 302, a comparison unit 304, a color information conversion unit 306, a color matching unit 308, and a half-toning unit 310.

The interface unit 314 can transfer information received from the image forming apparatus 330 to the printer driver 318 and can transfer information received from the printer driver 318 to the image forming apparatus 330. The information that the image forming apparatus 330 transfers to the printer driver 318 can include information regarding a residual amount of toner or ink of each color remaining in an toner or ink cartridge unit 350 of the image forming apparatus, and the information that the printer driver 318 transfers to the image forming apparatus 330 can include print data.

The printer driver 318 determines whether image forming instructions corresponding to the print data are transferred from an application program by a user. When the image forming instructions are transferred by the user, the printer driver 318 transfers the print data to the rendering unit 300.

The rendering unit 300 performs a rendering of the print data in a unit of a band according to a received command. The rendering of the print data compensates a resolution of a monitor with a resolution of the image forming apparatus 320. The resolution of the image forming apparatus 300 can be relatively higher than the resolution of the monitor. Accordingly, the rendering of the print data should be performed in order to output an image of the monitor (represented by the print data) having a relatively low resolution to the image forming apparatus 330 having a relatively high resolution. The calculation unit 302 calculates an amount of toner or ink of each color that is required to print the rendered print data.

The storage unit 312 stores the information regarding the residual amount of toner or ink of each color remaining in the toner or ink cartridge unit 350 of the image forming apparatus 330. Table 1 below shows an example of the information regarding the residual amount of toner or ink of each color stored in the storage unit 312.

TABLE 1

| Color | Residual Amount |
| --- | --- |
| Cyan | 26 |
| Magenta | 12 |
| Yellow | 3 |
| Black | 67 |
| Light Cyan | 56 |
| Light Magenta | 34 |
| Light Yellow | 86 |
| Light Black | 80 |

In Table 1, the residual amounts of toner or ink of eight colors are shown. The information being stored in the storage unit 312 may be varied according to the types of colors contained in the toner or ink cartridge unit 350 of the image forming apparatus 330.

The comparison unit 304 compares the amount of toner or ink of each color that is required to print the print data with the residual amount of toner or ink of each color that is stored in the storage unit 312. Table 2 shows an example of the required amount of toner or ink of each color that is required to print the rendered print data.

TABLE 2

| Color | Required Amount |
| --- | --- |
| Cyan | 8 |
| Magenta | 5 |
| Yellow | 4 |
| Black | 5 |
| Light Cyan | 7 |
| Light Magenta | 2 |
| Light Yellow | 5 |
| Light Black | 10 |

The comparison unit 304 can compare the residual amount of toner or ink of each color in Table 1, with the required amount of toner or ink of each color in Table 2. The comparison unit 304 determines whether there is any color of which the residual amount of toner or ink (Table 1) is less than the required amount of toner or ink (Table 2). If there is any color of which the residual amount of toner or ink (Table 1) is less than the required amount of toner or ink (Table 2) as a result of the determination, the comparison unit 304 transfers information specifying which color has an insufficient residual amount of toner or ink to the printer driver 318. For example, referring to Table 1 and Table 2, the comparison unit 304 transfers the information specifying that residual amount of the toner or ink of the color "Yellow" is insufficient to the printer driver 318.

The printer driver 318 can transfer the information received from the comparison unit 304 to a display-input unit 316 to inform the user of the specified color having an insufficient residual amount of toner or ink. The user can input a response to the display-input unit 316 and the printer driver 318 can transfer the response input by the user to the display-input unit 316 to the comparison unit 304.

The comparison unit 304 receives the response to the information transferred to the printer driver 318. This response can be either to continue the image forming process using other colors instead of the insufficient color or to cancel the image forming process. If the comparison unit 304 is instructed to continue the image forming process using other colors instead of the insufficient color, it transfers the print data and the information specifying which color has an insufficient amount of ink or toner to the color information conversion unit 306.

The color information conversion unit 306 represents the specified color having an insufficient residual amount of ink or toner using other colors. Table 3 below shows an example of information regarding unusable colors and corresponding usable colors stored in the color information conversion unit 306.

TABLE 3

| Unusable Color | Usable Color |
| --- | --- |
| Cyan | Magenta, Yellow, Black, Light Cyan, Light Magenta, Light Yellow, Light Black |
| Magenta | Cyan, Yellow, Black, Light Cyan, Light Magenta, Light Yellow, Light Black |
| Yellow | Cyan, Magenta, Black, Light Cyan, Light Magenta, Light Yellow, Light Black |
| Black | Cyan, Magenta, Yellow, Light Cyan, Light Magenta, Light Yellow, Light Black |
| Light Cyan | Cyan, Magenta, Yellow, Black, Light Magenta, Light Yellow, Light Black |
| Light Magenta | Cyan, Magenta, Yellow, Black, Light Cyan, Light Yellow, Light Black |
| Light Yellow | Cyan, Magenta, Yellow, Black, Light Cyan, Light Magenta, Light Black |
| Light Black | Cyan, Magenta, Yellow, Black, Light Cyan, Light Magenta, Light Yellow |

The color information conversion unit 306 stores the information regarding the unusable colors and the corresponding usable colors. For example, referring to Table 3, if "Cyan" is unusable, it can be represented using "light Cyan". Also, if "Yellow" is unusable, it can be represented using "Light Yellow". Although Table 3 shows an example in which only one color is unusable, two or more unusable colors can also be represented using the remaining usable colors.

The color matching unit 308 performs color matching of the print data according to a method set by the host computer 320. The half-toning unit 310 performs half-toning of the print data. The half-toning of the print data is a process of binarizing pixel data of the print data. In order to print the print data, the pixel data is binarized into '0' or '1' values in the range of 256 levels. The half-toned print data is then transferred to the interface unit 314.

The image forming apparatus 330 can include a control unit 340, a rendering unit 342, a color information conversion unit 344, a half-toning unit 346, a printing unit 348, the toner or ink cartridge unit 350, a storage unit 352, and a display-input unit 354. Although other components in addition to the construction as described above may be included in the image forming apparatus 330, only components applicable to this embodiment of the present general inventive concept are illustrated in FIG. 3.

The control unit 340 controls the components of the image forming apparatus 330 according to a control program, and receives the print data from the host computer 320. The toner or ink cartridge unit 350 contains toner or ink of various colors to print the print data. The storage unit 352 of the image forming apparatus 330 stores the residual amount of the toner or ink of each color contained in the toner or ink cartridge unit 350. The display-input unit 354 displays a state of the image forming apparatus 330 and can receive information from the user. The printing unit 348 prints the print data transferred from the control unit 106. Since the rendering, the color matching, and the half-toning of the print data can be performed by the host computer 320, the rendering unit 342, the color information conversion unit 344, and the half-toning unit 346 of the image forming apparatus 330 may not perform any particular operations. If the rendering, the color matching, and the half-toning of the print data are not performed by the host computer 320, the rendering unit 342, the color information conversion unit 344, and the half-toning unit 346 of the image forming apparatus 330 can perform the respective operations of the rendering unit 300, the color information conventional unit 306, and the half-toning unit 310 of the host computer 320, as described above.

FIG. 3 illustrates by way of example where the residual amount of toner or ink of a color required to form the image of the print data is insufficient. If the residual amount of toner or ink of each color required to form the image of the print data is sufficient, the print data is transferred to the image forming apparatus 330 to form an image of the print data.

Although FIG. 3 illustrates the host computer 320 processing the print data, print data may alternatively be processed by an image forming apparatus rather than a host computer.

Figure 4:
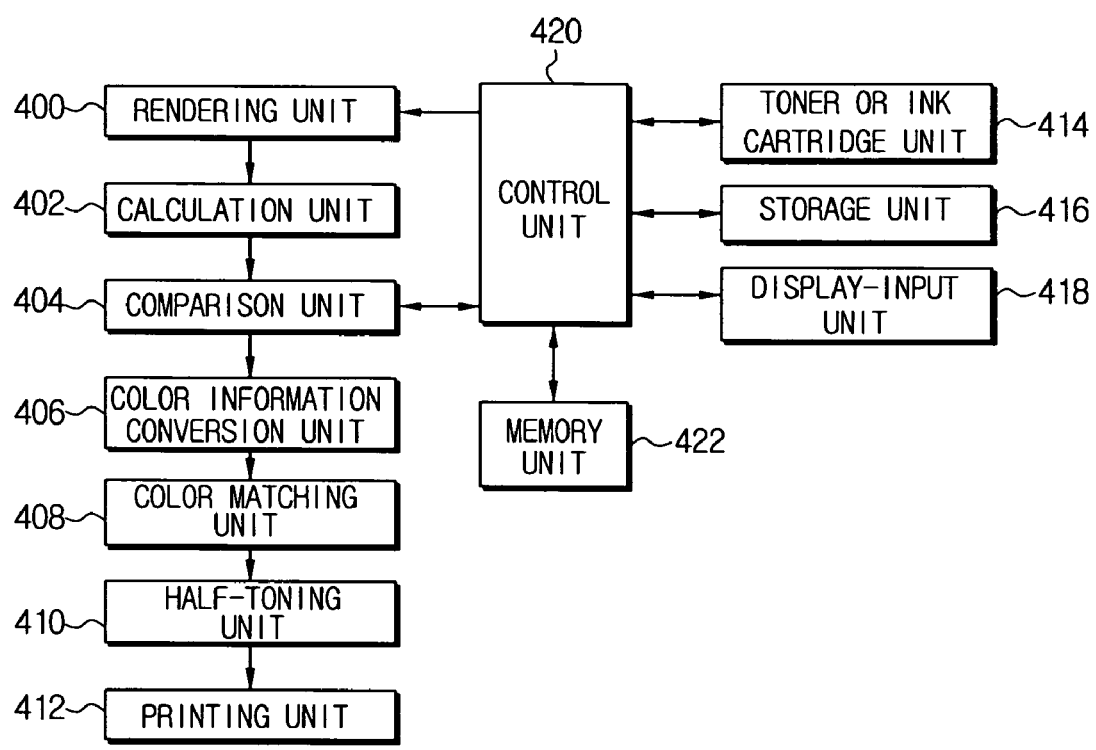
FIG. 4 is a block diagram illustrating a construction of an image forming apparatus that determines whether there is any insufficient color according to another embodiment of the present general inventive concept.

FIG. 4 is a block diagram illustrating a construction of an image forming apparatus to detect any insufficient color, according to another embodiment of the present general inventive concept.

Referring to FIG. 4, the image forming apparatus can include a control unit 420, a rendering unit 400, a calculation unit 402, a comparison unit 404, a color information conversion unit 406, a color matching unit 408, a half-toning unit 410, a printing unit 412, a toner or ink cartridge unit 414, a storage unit 416, a display-input unit 418, and a memory unit 422. Although other components in addition to the construction as described above may be included in the image forming apparatus, only components applicable to this embodiment of the present general inventive concept are illustrated in FIG. 4.

The memory unit 422 can temporarily store print data transferred from a host computer or information required to print the print data. The control unit 420 controls the components of the image forming apparatus according to a control program. The toner or ink cartridge unit 414 contains toner or ink of various colors to print the print data. The storage unit 416 stores information regarding a residual amount of the toner or ink contained in the toner or ink cartridge unit 414.

The display-input unit 418 displays an operating state of the image forming apparatus, and can receive a user's input of instructions regarding the image forming apparatus. In the embodiment of FIG. 4, the display-input unit 418 displays information transferred from the comparison unit 404, and receives a response from the user according to the displayed information. The information transferred from the comparison unit 400 will be further explained below.

Operation of the rendering unit 400, the calculation unit 402, the comparison unit 404, the color information conversion unit 406, the color matching unit and the half-toning unit 410 are similar to those performed by the rendering unit 300, the calculation unit 302, the comparison unit 304, the color information conversion unit 306, the color matching unit 308 and the half-toning unit 310 of the host computer 320 of FIG. 3 as described above.

As illustrated in FIG. 3, the host computer 320 can receive instructions to form an image of the print data from a user through the display-input unit 316 of the host computer 320. Similarly, as illustrated in FIG. 4 the image forming apparatus can receive instructions to form an image of the print data stored in the memory unit 422 from the user thorough the display-input unit 418. Also, FIGS. 3 and 4 depict the calculation of the required amount of toner or ink of each color with respect to the rendered print data, but the present general inventive concept is not limited thereto. In other words, the required amount of toner or ink of each color may be calculated after the color matching of the print data or the half-toning of the print data.

Figure 5:
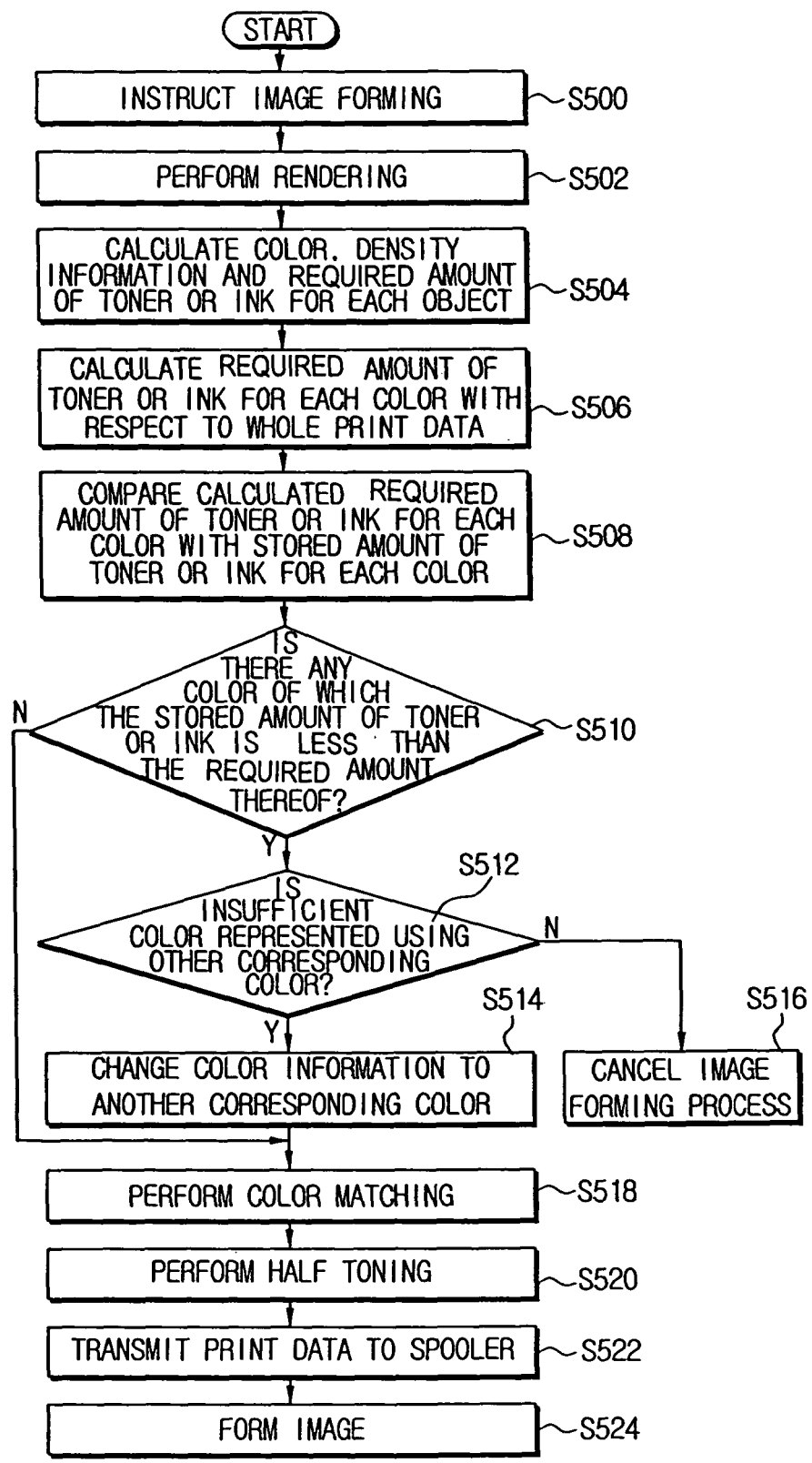
FIG. 5 is a flowchart illustrating a process of forming an image of print data according to another embodiment of the present general inventive concept.

FIG. 5 is a flowchart illustrating a process of forming an image of print data, according to another embodiment of the present general inventive concept. The process of FIG. 5 can be performed by either a host computer or an image forming apparatus. That is, in accordance with a user's preference, the process of FIG. 5 may be performed by the host computer or by the image forming apparatus. Hereinafter, the process of FIG. 5 as performed by the image forming apparatus will be explained.

At operation S500, a user uses a display-input unit of the image forming apparatus to instruct the image forming apparatus to form an image of print data having at least one printer object. The instructions can be input by key manipulation of the user. A rendering unit performs rendering of the print data at operation S502. The image forming apparatus calculates colors, density information, and a required amount of toner or ink for each printer object at operation S504. The colors, density information and the required amount of toner or ink for each printer object can be obtained through the rendering of the print data.

The image forming apparatus calculates an amount of toner or ink of each color required to form an image of the rendered print data at operation S506, and compares the amount of toner or ink of each color required to form an image of the rendered print data with a stored amount of toner or ink of each color at operation S508. A control unit of the image forming apparatus can measure the amount of toner or ink of each color contained in a toner or ink cartridge unit at predetermined time intervals, and transfers the corresponding information to a storage unit. The predetermined time intervals may be changed according to the user's preference. Specifically, if the user intends to obtain accurate information, the user can set the predetermined time intervals to be short, and if the user intends to reduce a load of the image forming apparatus, the user can set the predetermined time intervals to be long. After the instructions to form the image of the print data, the control unit measures the amount of toner or ink contained in the toner or ink cartridge unit, and transfers this information to the storage unit.

A comparison unit determines if there is any color of which the stored amount of toner or ink is less than the required amount of toner or ink at operation S510. If there is no color of which the stored amount of toner or ink is less than the required amount of toner or ink as a result of the determination, the control unit proceeds to operation S518. The image forming apparatus determines whether to represent the insufficient color using another color at the operation S512. This determination can be performed by an input of the user through the display-input unit. Also, if there is any insufficient color, the user may set the image forming apparatus to represent the insufficient color using another corresponding color without performing the operation S512. If the image forming apparatus decides to represent the insufficient color using another corresponding color, it proceeds to operation S514, while if not, it proceeds to operation S516. The image forming apparatus cancels the image forming process at the operation S516.

A color information conversion unit changes color information of the insufficient color to the color information of a corresponding color at the operation S514. The other corresponding color means a color determined to be similar to the insufficient color by the color information conversion unit.

A color matching unit performs color matching of the print data at the operation S518. A half-toning unit performs half-toning of the print data at operation S520, and transmits the print data to a spooler to temporarily store the print data at operation S522. The image forming apparatus forms the image of the temporarily stored print data at operation S524.

In FIG. 5, the representation of the insufficient color using another color without using the insufficient color is illustrated. However, the insufficient color may be partially used in forming the image of the print data. That is, a part of the print data can be printed using the insufficient color, and the remainder of the print data can be printed using another corresponding color. This method will be explained in more detail by example, while referring to Tables 1 and 2.

In Table 2, the amount of "Yellow" required to print the print data is 4, and in Table 1, the residual amount of "Yellow" is of 3. Accordingly, the image forming apparatus can print a part of the print data using "Yellow", and then print the remainder of the print data using "Light Yellow" (see Table 3).

As described above, the present general inventive concept provides advantages in that an image of print data can be formed using a color of which there is a sufficient residual amount of toner or ink in place a color of which there is an insufficient residual amount of toner or ink, and thus it can efficiently form the image of the print data even if the residual amount of toner or ink of a specified color is insufficient. Also, the present general inventive concept enables a user to promptly obtain information regarding toner or ink of a color of which the residual amount is insufficient.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of processing and forming an image of a plurality of colors of print data in a system including a host device to transfer the print data and an image forming apparatus to form the image of the print data transferred from the host device, the method comprising:
    calculating an amount of ink or toner of each color that is required to form the image of the print data;
    comparing the calculated required amount of the ink or toner for each of the plurality of colors with a residual amount of the ink or toner for each color to determine whether the stored residual amount of the ink or toner of each color is sufficient; and
    forming the image of a plurality of colors of the print data using an ink or toner of a color of which the residual amount of the ink or toner is sufficient in place of any color of which the stored residual amount of the ink or toner is less than the required amount of the ink or toner as a result of the comparison.

2. The method as claimed in claim 1, further comprising inquiring whether to form the image of the print data using the ink or toner of the color of which the residual amount of the ink or toner is sufficient if there is any color of which the stored residual amount of the ink or toner is less than the required amount of the ink or toner as the result of the comparison.

3. The method as claimed in claim 1, wherein the ink or toner comprises at least one color having a specified brightness difference with respect to one color.

4. The method as claimed in claim 1, wherein information regarding the residual amount of the ink or toner for each color is updated at predetermined time intervals or whenever the image is formed.

5. The method as claimed in claim 1, wherein, if there is any color of which the stored residual amount of the ink or toner is insufficient, a part of the print data is printed using the insufficient color, and the remainder of the print data is printed using other colors.

6. A method of forming an image, the method comprising:
    determining whether a residual amount of ink or toner of each of a plurality of colors is sufficient to form the image; and
    displaying on a user display input unit the plurality of colors having an insufficient residual amount of ink or toner and forming the image of a plurality of colors using a replacement representative color determined according to predetermined color representation information when the residual amount of ink or toner of one of the plurality of colors is insufficient.

7. The method as claimed in claim 6, wherein the determining whether the residual amount of ink or toner of each of the plurality of colors is sufficient comprises:
    calculating a required amount of ink or toner of each of the plurality of colors; and
    comparing the required amount of ink or toner of each of the plurality of colors to the residual amount of ink or toner of each of the plurality of colors.

8. The method as claimed in claim 6, further comprising:
    determining whether to cancel the forming of the image according to a response of a user to the displaying of the one of the plurality of colors having the insufficient amount of ink or toner.

9. The method as claimed in claim 6, wherein the representative color is another of the plurality of colors having a sufficient residual amount of ink or toner.

10. The method as claimed in claim 6, wherein the forming of the image using the representative color comprises forming the image using ink or toner of the representative color in place of the ink or toner of the one of the plurality of colors having the insufficient amount of ink or toner.

11. A system, having a host device and an image forming apparatus to form an image of a plurality of colors of print data transferred from the host device, the system comprising:
    a calculation unit to calculate an amount of ink or toner for each color that is required to form the image of the read print data;

a comparison unit to compare the calculated required amount of the ink or toner for each color with a stored residual amount of the ink or toner for each color; and a printer driver to instruct the image forming apparatus to form the image of a plurality of colors of the print data using an ink or toner of the color of which the residual amount of the ink or toner is sufficient in place of any color of which the stored residual amount of the ink or toner is less than the required amount of the ink or toner as a result of the comparison.

12. The system as claimed in claim 11, wherein the ink or toner comprises at least one color having a specified brightness difference with respect to one color.

13. The system as claimed in claim 11, wherein the image forming apparatus updates the information on the residual amount of the ink or toner for each color at predetermined time intervals, and transfers the updated information on the residual amount of the ink or toner to the host device.

14. The system as claimed in claim 11, wherein the image forming apparatus updates the information on the residual amount of the ink or toner for each color whenever the image forming is terminated, and transfers the updated information on the residual amount of the ink or toner to the host device.

15. The system as claimed in claim 11, wherein the printer driver instructs to print a part of the print data using the insufficient color, and then print the remainder of the print data using other colors if there is any color of which the stored residual amount of the ink or toner is insufficient.

16. A system to process print data and form an image of the processed print data, the system comprising:
  an image forming apparatus to form the image of a plurality of colors of the processed print data, the image forming apparatus comprising:
    a toner or ink cartridge to store a residual amount of toner or ink of one or more colors, and
    a printing unit to print out the image of the processed print data; and
  a host device to process the print data and to transfer the processed print data to the image forming apparatus, the host device comprising:
    a print data processing unit to process the print data,
    a sufficiency determination unit to determine whether the residual amount of toner or ink of each of the one or more colors stored in the toner or ink cartridge of the image forming apparatus is sufficient to form the image of the processed print data,
    a color information conversion unit to select a representative color according to predetermined color representation information to represent a color having an insufficient amount of toner or ink as determined by the sufficiency determination unit, and
    a communication part to transfer the processed print data to the image forming apparatus,
    wherein the sufficiency determination unit calculates a required amount of toner or ink of each of the one or more colors, and compares the required amount of toner or ink of each of the one or more colors to the residual amount of toner or ink of each of the one or more colors.

17. The system as claimed in claim 16, wherein the host device further comprises:
  a storage to store information regarding the residual amount of toner or ink of each of the one or more colors stored in the toner or ink cartridge of the image forming apparatus, and to transfer the information regarding the residual amount of toner or ink of each of the one or more colors to the sufficiency determination part.

18. The system as claimed in claim 16, further comprising:
  a display-input unit communicating with the host device to inform a user of the color having an insufficient amount of toner or ink determined by the sufficiency determination unit, and to input a response of the user to determine whether the image forming apparatus forms the image.

19. The system as claimed in claim 16, wherein the representative color is one of the one or more colors having a sufficient residual amount of toner or ink as determined by the sufficiency determination unit.

20. The system as claimed in claim 16, wherein the print data processing unit comprises:
  a rendering unit to perform rendering of the print data;
  a color matching unit to perform color matching of the print data; and
  a half-toning unit to perform half-toning of the print data.

* * * * *